UNITED STATES PATENT OFFICE.

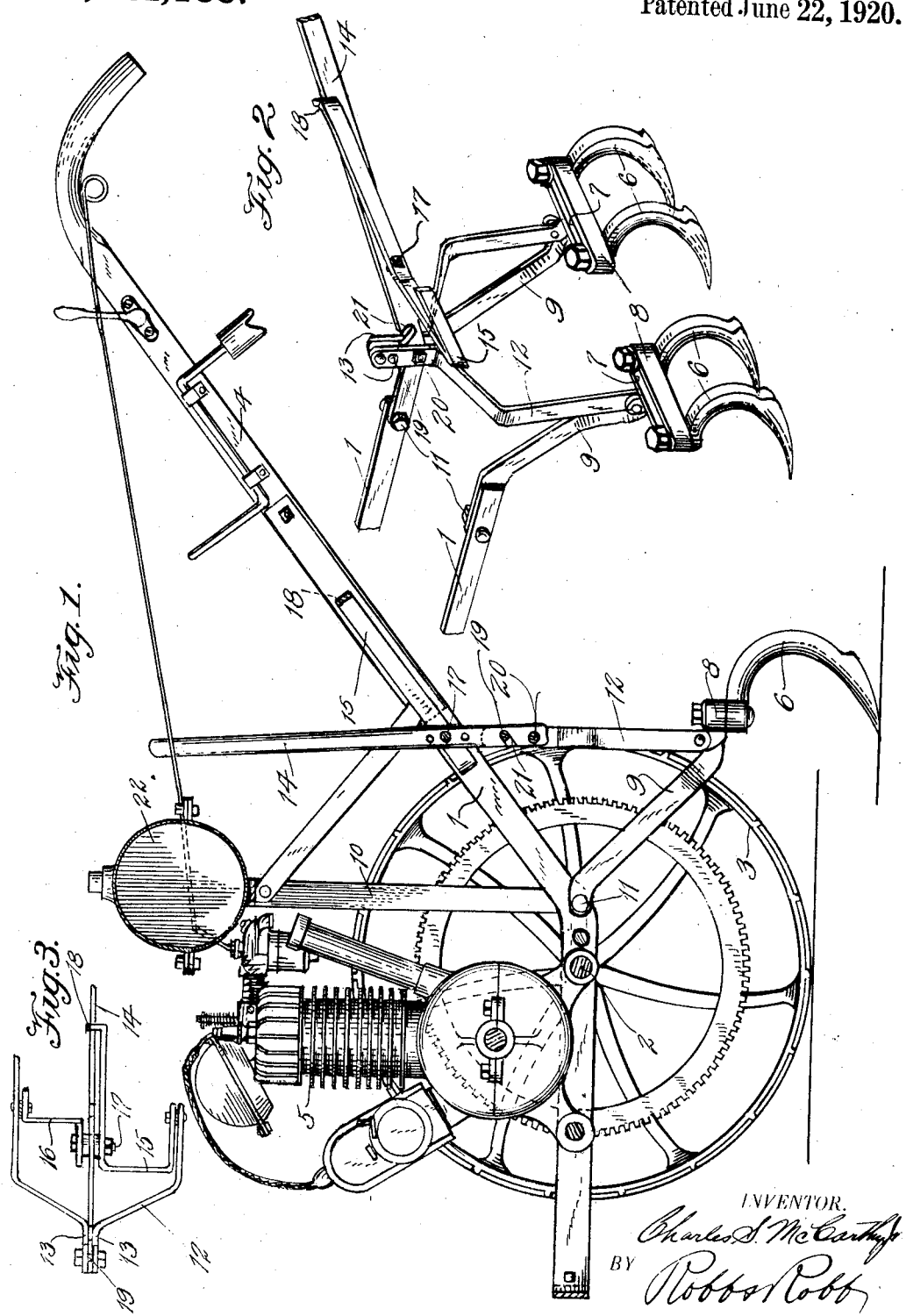

CHARLES S. McCARTHY, JR., OF SANDUSKY, OHIO.

CULTIVATOR.

1,344,138. Specification of Letters Patent. Patented June 22, 1920.

Application filed December 13, 1918, Serial No. 266,646. Renewed November 6, 1919. Serial No. 336,234.

*To all whom it may concern:*

Be it known that I, CHARLES S. MC-CARTHY, Jr., a citizen of the United States, residing at Sandusky, in the county of Erie and State of Ohio, have invented certain new and useful Improvements in Cultivators, of which the following is a specification.

The present invention comprises certain improvements in what are generally known as wheeled cultivators. The improvements involved in the invention embody certain novel earth working devices, and while adapted particularly to be used in connection with a motor driven cultivator devised by me, the cultivating means hereinafter presented are equally adapted to be used in connection with manually propelled implements of the type of the invention.

An especial object of my invention has been to design the earth working devices of my implement so that they may be readily placed in active positions for use, or adjusted so as to be inactive; to make provision for adjustment of the degree of cutting action of the cultivating points or shovels; and to render the means by which the cultivating parts are operated to carry them to active or inactive positions, as simple as possible.

The foregoing and other objects of my invention are accomplished in a manner which will be apparent upon reference to the aforegoing description in connection with the annexed drawings, in which:

Figure 1 is a sectional view of a motor driven cultivator embodying my invention;

Fig. 2 is a perspective view showing more particularly the supporting arms, yoke, and operating lever by which the earth working devices are raised and lowered in a position maintaining the devices elevated.

Fig. 3 is a plan view of supporting and actuating parts for the earth working devices.

Similar reference characters refer to similar parts throughout this specification and the drawings.

In view of the fact that the special frame construction of my implement is not material to the invention, nor is the motor driving mechanism, it will be unnecessary to set forth these parts in detail. It suffices to state that I provide a frame composed of spaced side members 1, carried upon an axle 2, there being the usual ground wheels 3 loose on said axle. Handles 4, one for each side member of the frame, are attached to said side members and extend rearwardly in the customary manner. The motor 5 is suitably connected by trains of gearing with the ground wheel and under the control of clutch means not shown, and throttle devices illustrated but immaterial to this invention, the machine will be advanced over the surface to be operated upon.

The earth working devices used in connection with my cultivator may be of different types dependent of course upon the particular class of work to be performed. Those which I show may preferably, though not necessarily, be employed, and they comprise cultivating teeth or shovels 6 laterally adjustable in slots 7 of spaced carriers 8. The carriers 8 each have a forwardly extending arm 9 pivoted to the frame members 1 by the fastenings which connect the lower portions of the U-shaped standard 10 with said frame members 1. The points of pivotal connection of the arms 9 with the parts 1 are designated by 11. For the adjustment of the earth working devices 6 I employ a supporting yoke 12, the sides of which are pivotally connected at their lower ends with the rear extremities of the arms 9. Said sides of the yoke 12 are formed with vertical extensions 13 at their upper extremities receiving therebetween a lever 14. The lever 14 has a series of openings intermediate its ends by which it may be adjustably fulcrumed upon a bracket device disposed between the frame members 1 at the lower extremities of the handles 4. The bracket device is made in two parts, a U-shaped part 15 bolted to the left handle 4 and frame member 1 and the double angled part 16 bolted to the right handle 4 and frame member 1. A bolt 17 connects these parts 15 and 16 and forms the pivot or fulcrum of the lever 14. The innermost portion of the U-shaped part 15 of the bracket device extends quite a little distance rearward from the pivot 17 and is bent laterally to form a hook 18 beneath which the lever 14 may be engaged when pressed rearwardly and downwardly. Obviously a rearward and downward pressing of the lever 14 will raise the yoke 12 and the connected earth working devices 6, because the lower end of the lever 14 is attached pivotally to the lowermost one of two bolts or fastenings 19 and 20 by which the side parts of the yoke 12 are connected together. The arrangement of the bolts 19 and 20 and the formation of a laterally inclined slot 21 in the lower end portion of the lever 14, just above the opening through which the lower bolt 19 passes, affords a peculiar functioning of the parts in the following manner. By disengaging the lever 14 from beneath the hook 18 of the bracket device part 15, and raising said lever, the lever and the yoke 12 will be caused to move into substantial alinement. In matter of fact, the lever will move forwardly toward the gasoline tank 22 slightly beyond a position of near alinement with the yoke 12 owing to the formation of the slot 21 in the lever, said slot receiving the bolt 20 and the latter forming a stop preventing undue forward movement of the lever. With the parts thus adjusted the lever 14 virtually forms a locking member rigidly maintaining the cultivating shovels or earth working devices at their lowermost adjustment which is their earth working position, it being required that the lever 14 be forced rearwardly to after a manner effect a break joint action between the parts 17 and 12 before the earth working devices can be elevated.

It will be understood, within the purview of my invention, that I use the term "yoke" to describe the part 12 in the general sense of a connector. Obviously such connector might take one of a number of specifically different forms, and still co-act with the lever 14 to effectively hold the earth-working tools in effective or non-effective positions. The term "yoke" therefore is a relative one and any suitable equivalent part or parts might be employed.

Having thus described my invention, what I claim as new is:—

1. In a cultivator of the type described, the combination of a wheeled frame, earth working devices, and means supporting said devices upon the frame including arms pivotally connected with the frame, carriers to which said devices are attached and located at the free ends of said arms, a yoke pivotally connected at its lower portions to said arms, and lever mechanism on the frame connected with the yoke for raising and lowering the same.

2. In a cultivator of the type described, the combination of a wheeled frame, earth working devices, and means supporting said devices upon the frame including arms pivotally connected with the frame, carriers to which said devices are attached and located at the free ends of said arms, a yoke pivotally connected at its lower portions to said arms, lever mechanism on the frame connected with the yoke for raising and lowering the same, said lever mechanism including a bracket device on the frame and formed with a hook, a lever pivoted between its ends to said bracket device and also pivotally connected with the yoke aforesaid, said lever being engageable with said hook to hold the yoke and earth working devices elevated, the points of pivotal support of the lever and pivotal connection of said lever with the yoke being such that the lever is movable into a position in which the yoke and parts supported thereby are lowered and locked in active positions against upward movement.

3. In a cultivator of the type described, the combination of a wheeled frame, earth working devices, and means supporting said devices upon the frame including arms pivotally connected with the frame, carriers to which said devices are attached and located at the free ends of said arms, a yoke pivotally connected at its lower portions to said arms, lever mechanism on the frame connected with the yoke for raising and lowering the same, said lever mechanism including a lever pivotally supported on the frame and having pivoted connection with the yoke and movable into a position such that it is in substantial alinement with the yoke to lock the latter in a position maintaining the earth working devices active.

4. In a cultivator of the type described, the combination of a wheeled frame comprising side members and supporting ground wheels, cultivating devices, supporting means for said devices including arms pivoted to the frame, a yoke pivotally connected at its lower side portions to said arms, a bracket device attached to the side members of the frame, a lever pivoted between its ends to said bracket device and pivotally connected at one end with the upper portion of said yoke, and adapted to move the yoke into a position in which the lever locks the yoke and cultivating devices connected therewith in lowered active positions, said lever being shiftable to exert an upward pull and thereby raise the yoke and cultivating devices.

5. In a cultivator of the type described, the combination of a wheeled frame comprising side members and supporting ground wheels, cultivating devices, supporting means for said devices including arms pivoted to the frame, a yoke pivotally connected at its lower side portions to said arms, a bracket device attached to the side members of the frame, a lever pivoted between its ends to said bracket device and pivotally connected at one end with the upper portion of said yoke, and adapted to move the yoke into a position in which the lever locks the yoke and cultivating devices connected therewith in lowered active positions, said lever being shiftable to exert an upward pull and thereby raise the yoke and cultivating devices, a stop member on the yoke engageable with the lever at a point intermediate the points of connection of said lever with the yoke and with the bracket device, whereby to limit the throw of the lever in bringing it to a position carrying the yoke downward to render the cultivating devices active, the bracket device having an extension equipped with a hook adapted to engage the lever to thereby hold the latter in a position in which the cultivating devices are elevated.

6. In a cultivator, a supporting frame, earth working devices, means connecting the earth working devices with the frame and means for adjusting said devices comprising a lever movable so as to assume a position to automatically lock said devices in a predetermined position, and means coacting with the lever whereby to hold said devices in another position.

In testimony whereof I affix my signature.

CHARLES S. McCARTHY, Jr.